May 15, 1951 H. J. MURPHY 2,552,805
ROTARY STUD
Filed Oct. 31, 1946 2 Sheets-Sheet 1
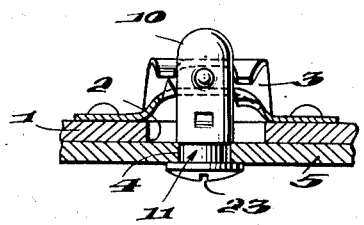
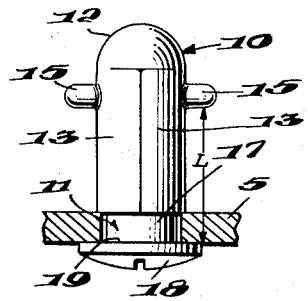
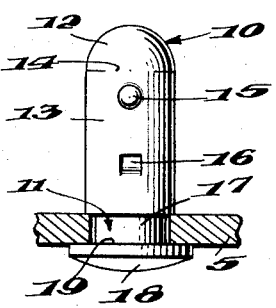
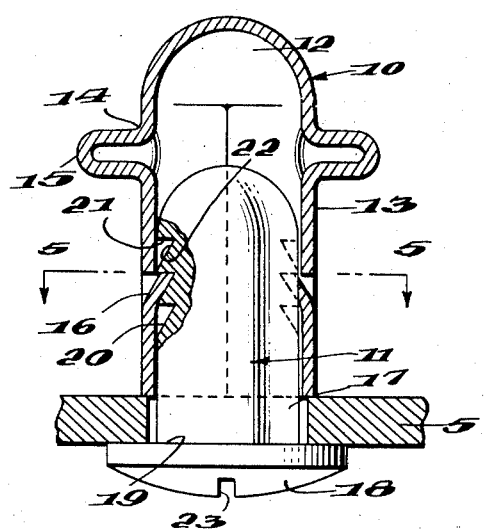
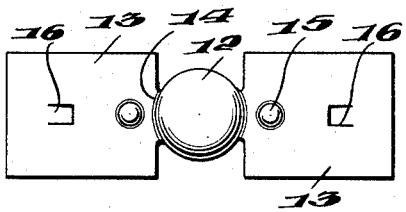
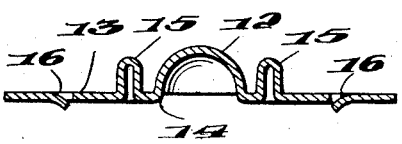
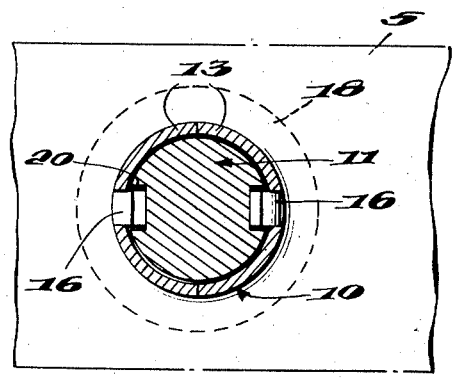
Inventor
HOWARD J. MURPHY,
By John Todd
Attorney May 15, 1951  H. J. MURPHY  2,552,805
ROTARY STUD
Filed Oct. 31, 1946  2 Sheets-Sheet 2
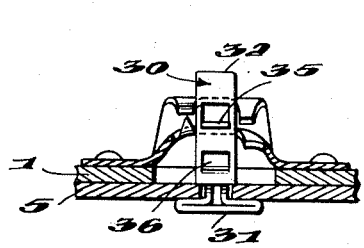
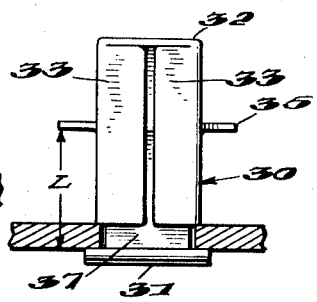
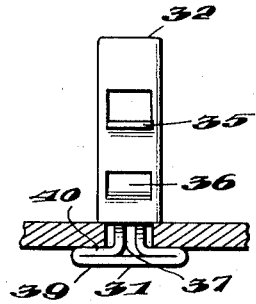
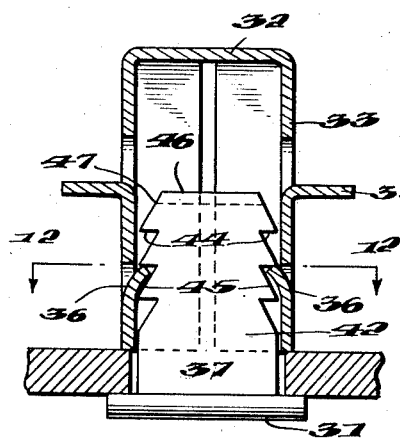
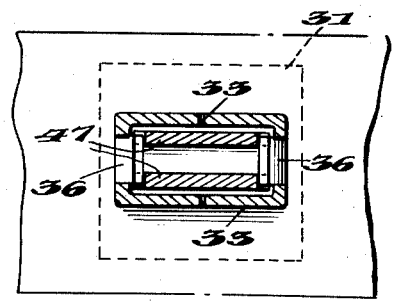
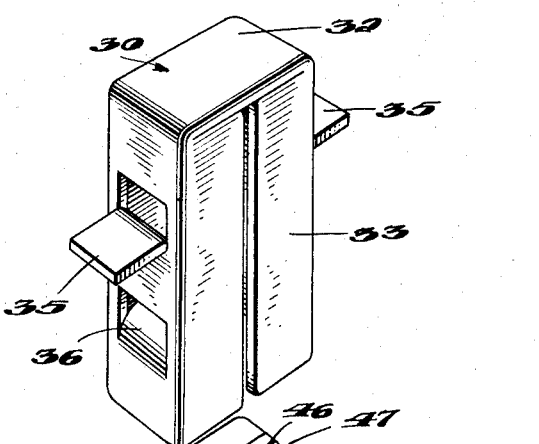
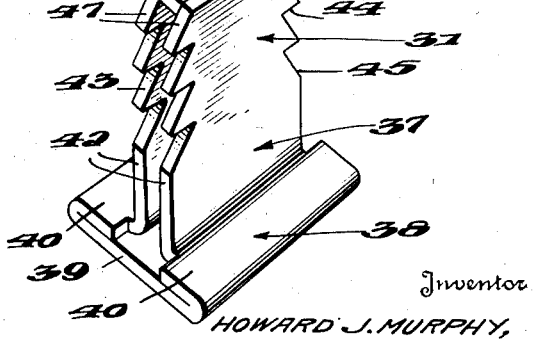
Inventor
HOWARD J. MURPHY,
By John Todd
Attorney Patented May 15, 1951

2,552,805

UNITED STATES PATENT OFFICE 2,552,805

ROTARY STUD

Howard J. Murphy, Lynnfield, Mass., assignor to United-Carr Fastener Corporation, Cambridge, Mass., a corporation of Massachusetts Application October 31, 1946, Serial No. 706,966

4 Claims. (Cl. 24—221)

The present invention relates to rotary studs for rotary operative fasteners and the like and aims generally to improve existing rotary studs of this type.

Rotary operative fasteners or so-called "cowl-type" fasteners comprise a stud receptacle or socket member attached to a support on one of the parts to be fastened adapted to receive and lockingly engage a stud member rotatably mounted in the part to be attached to the support. According to one type of fastener in general use the rotary stud is provided with laterally extending radially disposed arms for engagement with the locking seat of the stud receptacle or socket member.

One of the objects of the present invention is the provision of a rotary stud for rotary operative fasteners of the type described above in which the effective stud length as determined by the distance between the bearing face of the head and the axis of the fastener-engaging radial arms may be varied to suit varying thicknesses of supports or members to be attached thereto.

A further object of the invention is the provision of a rotary stud of novel construction and design which may be economically manufactured and readily installed in a fastener secured installation.

The above and other objects of the invention will be apparent to persons skilled in the art from a consideration of the accompanying drawings and annexed specification illustrating and describing two preferred forms of stud embodying the invention.

In the drawings—

Fig. 1 is a transverse sectional view of a fastener secured installation embodying a stud member according to one form of the invention;

Fig. 2 is a side elevation of the stud member shown in Fig. 1;

Fig. 3 is a side elevation of the stud member viewed at right angles to Fig. 2;

Fig. 4 is an enlarged vertical sectional view of a rotary stud member of the type illustrated in Fig. 1;

Fig. 5 is a transverse sectional view taken on the line 5—5 of Fig. 4;

Fig. 6 is a plan view of the blank from which the female part of the stud member is made;

Fig. 7 is a longitudinal sectional view of the blank from which the female part of the stud member is made as taken on the line 6—6 of Fig. 5;

Fig. 8 is a vertical sectional view of a fastener secured installation embodying a second form of rotary stud according to the invention;

Fig. 9 is a side elevation of the rotary stud member shown in Fig. 7;

Fig. 10 is an edge elevation of a rotary stud member shown in Fig. 7;

Fig. 11 is an enlarged vertical sectional view of the rotary stud member shown in Fig. 8;

Fig. 12 is a transverse sectional view taken on the line 12—12 of Fig. 11;

Fig. 13 is a detailed perspective view of the female member of the rotary stud shown in Figs. 8 to 10 inclusive; and Fig. 14 is a detailed perspective view of the male member of the rotary stud shown in Figs. 8 to 12.

Rotary stud fastener parts, as in the present invention, are designed for use in rotary operative fasteners, for example, fasteners of the so-called cowl fastener type. Such fasteners are extensively used to detachably connect two or more parts, for example, aircraft cowling, radio cabinet panels, junction box covers, access doors and the like. Installations in which they are used usually comprise a support 1, which may be a metal sheet apertured at 2 and on one face of which is mounted a stud receptacle or spring 3. The part 4 to be attached to the support 1 is usually apertured as at 5 to rotatably receive a stud fastener element designed upon partial rotation to lockingly engage the stud receptacle 3. The stud receptacle may, of course, be of any desired construction, that illustrated in Figs. 1 and 8 of the accompanying drawings conforming to the receptacle shown in the Bedford Patent No. 2,306,928, dated December 29, 1942 though other types of receptacles may be used.

The embodiment of the rotary stud shown in Figs. 1 to 7 inclusive comprises a hollow female member 10 and a male member 11 telescopically and adjustably secured therein. The female member 10 is preferably an elongated hollow tubular part formed of sheet metal and preferably is provided with a semi-spherical nose portion 12 and semi-cylindrical wing portions 13 connected to the nose portion 12 by bendable sections 14, whereby the wing sections 13 may be disposed coaxially with the nose to provide opposed semi-circular side portions of a substantially cylindrical barrel as is illustrated in Figs. 2, 3 and 4. Each of the wing portions 13 may be formed with an outwardly extending projection 15 adjacent the nose end and preferably, though not necessarily, these projections may be integral with the sections 13 as by being drawn therefrom. When the sections 13 are disposed in abutting relationship in axial alignment with the nose 12, the projections 15 provide laterally extending arms radially disposed with respect to the barrel, to serve as fastener-engaging arms adapted for locking engagement with the locking seat of the stud receptacle 3.

The opposed semi-cylindrical barrel sections 13 are also provided with inwardly directed locking means for engagement with the male member 11 of the stud so as to lock it in a position of desired adjusted stud length. As illustrated, such locking means may comprise a tongue or like member 16 cut from the body of each of the sections 13 and extending inwardly at an oblique angle thereto as shown in Fig. 4. By reason of the fact that the opposed tongues 16 are formed on separate barrel sections 13, each connected to the nose by the connection 14, they are adapted for resilient engagement with the male member of the stud as will hereinafter be described.

The tubular projections 15 may be drawn from the sections 13 and the locking tongues 16 struck therefrom, prior to bending the sections 13 into axial alignment with the nose 12, as shown in Figs. 6 and 7.

The male member 11 of the stud preferably comprises a shank portion 17, which may be cylindrical, and which is provided at one end with an enlarged head 18 provided with a bearing surface 19 for bearing engagement with an outer face of the part 5 to be attached to the support. The shank portion 17 is provided, adjacent the nose end thereof, with a longitudinal series of diametrically opposed recesses 20 for the reception of the locking tongues 16. Preferably these recesses 20 are ratchet shaped, each having a locking face 21 disposed substantially normal to the axis of the shank 17, and an oblique camming face 22. The recesses preferably are not continuous peripherally of the stud shank, but merely are of sufficient width to receive the locking tongues 16, so that when the latter are in locking engagement therewith, relative rotation between the male and female members of the stud is prevented. The head 18 of the male member may be provided with suitable means, for example, a keyway 23, to receive a tool, whereby the stud may be rotated to cause the radial arms 15 to lockingly engage the locking seat of the stud receptacle.

In fastenings of the rotary operative type as described above and as illustrated in Figs. 1 and 8, it is important that the rotary stud have a proper effective stud length, as determined by the distance between the radial arms 15 and the bearing face 19 as indicated by the reference character L, Figs. 2 and 9. This may vary, in different installations, depending upon the thickness of the support 1 or of the part 5 to be attached thereto or both. According to the present invention, variations of the effective stud length L may be effected by the selective engagement of the locking tongues 16 in the desired recess 20 of the series.

The embodiment of rotary stud fastener member, illustrated in Figs. 8 to 14 inclusive, comprises a hollow one-piece sheet metal female member 30 and a one-piece sheet metal male member 31 adapted to be telescopically and adjustably connected together.

The female member 30 is preferably formed of a flat strip of sheet metal shaped to provide an elongated hollow barrel of rectangular cross section and comprising a relatively rigid nose portion 32 and laterally resilient side portions 33 of channel-shaped cross section as shown in Fig. 12. The web portion of the channel-shaped side portions 33 are formed with outwardly turned arms 35 cut therefrom, which arms may be of single thickness sheet metal and are adapted to engage and be locked against the locking seat of the stud receptacle 3 as will be apparent.

The opposed channel-shaped side portions of the barrel are also provided with inwardly directed locking means for engagement with the male member 31 of the stud so as to lock it in a position of desired stud length. As illustrated, such locking means may comprise a tongue or like member 36 cut from the web portion of each channel-shaped side 33 and extending inwardly at an oblique angle thereto as shown in Fig. 11.

By reason of the fact that the channel-shaped side sections 33 are integrally joined to the nose portion 32, the tongues 36 are adapted for resilient or yielding engagement with the male member of the stud.

The male member 31 of the stud may be formed from a single strip of flat or other desirably shaped sheet metal and preferably comprises a shank portion 37 of rectangular cross section and an enlarged head 38. According to one preferred embodiment, the head 38 may comprise a central outer portion 39 and folded over wing portions 40 providing a non-circular or rectangular head by means of which the stud may be rotated.

The shank 37 may be formed from extensions 41 extending from the wings 40 in spaced planes approximately normal to the plane of the wings 40, and preferably the width of the extensions 41 is less than the corresponding dimension of the head 38 so that the head will be of greater dimension than the shank in all directions.

The opposed edge portions of the shank are provided with a series of longitudinally spaced recesses for the reception of the locking tongues 36. Preferably these recesses 43 are ratchet shaped, each having a locking face or shoulder 44 and an oblique camming face 45. The terminal nose end 46 of the male member is preferably tapered as at 47 to facilitate insertion of the nose end 46 past the locking tongue 36.

From the above it will be apparent that the male member 31 may be inserted into the female member 30 until the locking tongue is engaged in a selective recess 43 as may be determined by the thickness of the part 5 in which the stud is rotatably mounted. In this manner the effective stud length L may be varied to suit varying conditions and insure a proper clamping action between the bearing surface of the stud head and the locking seat of the stud receptacle.

Advantages of the invention reside in the simplicity of construction in that the male and female members may each be of one-piece construction, readily connected as when applied to a supporting structure in such a manner as to provide for proper effective stud length notwithstanding variations in thickness of the supporting member.

Although I have illustrated and described two preferred embodiments of the invention, I do not intend to be limited thereto as the scope of the invention is best defined in the appended claims.

I claim:

1. A rotary stud for rotary operative fasteners and the like adapted for interlocking engagement with a cooperating locking surface of a socket member, said stud comprising telescoping male and female members, said male member including a shank portion with a head at one end thereof and a series of spaced notches in said shank portion spaced from said head, said female member including a nose portion with opposed integral wall sections depending therefrom and providing a shank-receiving bore opening only at the end opposite said nose and having laterally extending fastener-engaging portions adjacent said nose for interlocking engagement with a cooperating holding surface of a socket member, said opposed wall sections having resilient portions extending inwardly of said bore for selective locking engagement with said notches of said shank portion, said shank portion and said wall sections including opposed surfaces extending longitudinally thereof for preventing relative rotation of said male and female members.

2. A rotary stud for rotary operative fasteners and the like for interlocking engagement with a cooperating locking surface of a socket member, said stud comprising telescoping male and female members, said male member including a cylindrical shank portion with a head at one end thereof and a series of spaced notches in said shank portion spaced from said head, said female member including a nose portion with opposed semi-cylindrical wall sections depending therefrom and providing a bore open only at the end opposite said nose for receiving said shank, said female member having fastener-engaging arms extending laterally therefrom for interlocking engagement with a cooperating locking surface of a socket member, said opposed wall sections having resilient portions extending inwardly of said bore for selective locking engagement with said notches of said shank portion, said shank portion including in said notches surfaces extending longitudinally of said shank portion and said resilient portions including side edges engaging said longitudinally extending surfaces in said notches to prevent relative rotation of said male and female members.

3. A rotary stud for rotary operative fasteners and the like for interlocking engagement with a cooperating locking surface of a socket member, said stud comprising telescoping sheet metal male and female members, said male member including a shank portion of rectangular cross-section with an enlarged head at one end thereof and a series of spaced notches in said shank portion spaced from said head, said female member being elongated and of rectangular cross-section and having a relatively rigid nose and channel-shaped sides providing an opening at the end opposite said nose for non-rotatably receiving said shank, said sides having outwardly extending fastener-engaging arms adjacent said nose for interlocking engagement with a cooperating locking surface of a socket member and inwardly extending locking means adapted for snap-locking engagement with the notches of said male member.

4. A rotary stud for rotary operative fasteners and the like for interlocking engagement with a cooperating locking surface of a socket member, said stud comprising telescoping male and female members, said male member including a substantially cylindrical shank portion with an enlarged head at one end thereof and a series of spaced notches in said shank portion spaced from said head, said female member including a substantially tubular barrel portion with an outwardly rounded nose portion at one end providing a shank-receiving bore opening only at the end opposite said nose and laterally extending fastener-engaging arms disposed adjacent said nose for interlocking engagement with a cooperative locking surface of a socket member, said barrel portion having inwardly extending resilient prongs for snap lock engagement with the notches of said shank portion, said shank portion including abutments at the sides of said notches for engaging the side edges of said resilient prongs to prevent relative rotation of said male and female members.

HOWARD J. MURPHY.

REFERENCES CITED

The following references are of record in the file of this patent:

UNITED STATES PATENTS

| Number | Name | Date |
| --- | --- | --- |
| 934,258 | Adams | Sept. 14, 1909 |
| 2,364,906 | Lumsden | Dec. 12, 1944 |
| 2,422,289 | Churchill | June 17, 1947 |
| 2,425,636 | Parkin | Aug. 12, 1947 |

FOREIGN PATENTS

| Number | Country | Date |
| --- | --- | --- |
| 3,640 | Great Britain | of 1873 |
| 2,972 | Great Britain | of 1883 |
| 65,394 | Switzerland | of 1913 |